(12) United States Patent
Razzell

(10) Patent No.: US 12,149,280 B2
(45) Date of Patent: Nov. 19, 2024

(54) DYNAMIC ERROR QUANTIZER TUNING SYSTEMS AND METHODS

(71) Applicant: Maxim Integrated Products, Inc., San Jose, CA (US)

(72) Inventor: Charles Razzell, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 214 days.

(21) Appl. No.: 17/580,607

(22) Filed: Jan. 20, 2022

(65) Prior Publication Data

US 2022/0140893 A1 May 5, 2022

Related U.S. Application Data

(63) Continuation of application No. 17/078,337, filed on Oct. 23, 2020, now Pat. No. 11,239,909.

(60) Provisional application No. 62/931,127, filed on Nov. 5, 2019.

(51) Int. Cl.
| | |
|---|---|
| H04B 10/035 | (2013.01) |
| H04B 10/077 | (2013.01) |
| H04B 10/63 | (2013.01) |

(52) U.S. Cl.
CPC ......... H04B 10/035 (2013.01); H04B 10/077 (2013.01); H04B 10/63 (2013.01)

(58) Field of Classification Search
CPC ..... H04B 10/035; H04B 10/077; H04B 10/63
USPC .......................................................... 398/3
See application file for complete search history.

(56) References Cited

U.S. PATENT DOCUMENTS

| | | | | |
|---|---|---|---|---|
| 8,873,974 | B2* | 10/2014 | Hueda | H04B 10/60 |
| | | | | 398/208 |
| 10,361,891 | B2* | 7/2019 | Awadalla | H04B 10/616 |
| 11,032,020 | B2* | 6/2021 | Sun | H04L 7/02 |
| 2018/0034552 | A1* | 2/2018 | Oyama | H04B 10/6165 |
| 2018/0183631 | A1* | 6/2018 | Awadalla | H04B 10/616 |

FOREIGN PATENT DOCUMENTS

| | | |
|---|---|---|
| CN | 102571227 A | 7/2012 |
| CN | 104521176 A | 4/2015 |
| CN | 107679000 A | 2/2018 |
| WO | 2018060990 A1 | 4/2018 |

OTHER PUBLICATIONS

Notice of allowance mailed Sep. 15, 2023 in related Chinese patent application No. 202011221781.9, (8 pgs).

* cited by examiner

*Primary Examiner* — Mohammad R Sedighian
(74) *Attorney, Agent, or Firm* — North Weber & Baugh; Michael North

(57) ABSTRACT

Dynamic error-quantizer tuning systems and methods prevent misconvergence to local minima by using a dynamic quantizer circuit that controls reference voltages of three or more comparators that are independently adjusted to modify the transfer function of the dynamic quantizer circuit. A weighted sum of the comparator outputs is subtracted from the input to form an error signal in a control loop. The ratio of the reference voltages is chosen to reduce or eliminate local minima during a convergence of the control loop and is set to values that minimize a mean squared error signal with respect to discrete modulation states of the input after the convergence of the control loop is complete.

9 Claims, 9 Drawing Sheets

DYNAMIC ERROR QUANTIZER TUNING SYSTEMS AND METHODS

CROSS REFERENCE TO RELATED PATENT APPLICATIONS

The present application is a continuation of and claims priority benefit, under 35 U.S.C. § 120, to co-pending and commonly-assigned U.S. patent application Ser. No. 17/078,337, entitled "Dynamic Error Quantizer Tuning Systems and Methods", filed on Oct. 23, 2020, and listing as inventor Charles Razzell, which claims priority, under 35 U.S.C. § 119(e), from U.S. Provisional Patent Application Ser. No. 62/931,127 entitled "Dynamic Error Quantizer Tuning Systems and Methods," filed on Nov. 5, 2019 and listing as inventor Charles Razzell. Each reference mentioned in this patent document is incorporated by reference herein in its entirety and for all purposes.

BACKGROUND

The present disclosure relates generally to signal processing in high-speed communication circuits. More particularly, the present invention relates to dynamic control of the transfer function of an error quantization function used in a decision-directed phase or polarization rotation tracking control loop.

In the past few decades, telecommunication networks have seen an ever-increasing demand for bandwidth. Large available bandwidth is a major factor in the increasing popularity of high-speed optical communication systems—whether for transferring data chip-to-chip or between Wide Area Network (WAN) fiber-optic links. For example, optical transceivers designed for short-distance (e.g., a few hundred meters) interconnects over optical fiber are in high demand in data center and campus networks.

Coherent optical links communicate data over different channels that correspond to different phases and/or polarizations of an input signal to the optical fiber. While transmitted data typically are aligned relative to a common clock, delays are introduced into the channels due to inherent characteristics of the transmitter, receiver, and optical fiber, such that polarization and phase in the various channels arrives at the receiver with unknown phase rotation in phase polarization dimensions, which are inverted to recover the transmitted data. In certain designs, misconvergence in complex LMS control loops may further cause a loop to settle at a location other than a desired global optimum.

Accordingly, it is desirable to provide improved coherent signal processing systems and methods that overcome the shortcomings of existing approaches.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
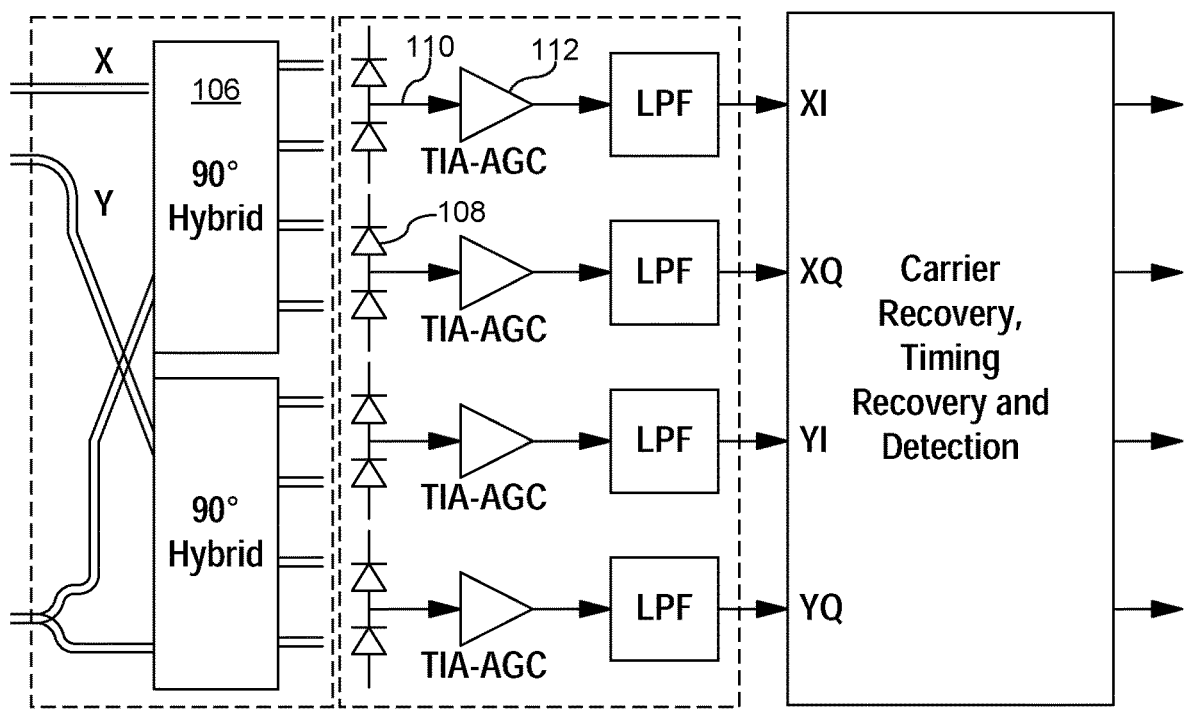
FIG. 1 ("FIG. 1") is a block diagram of a conventional dual polarization quaternary amplitude modulation (DP-QAM) receiver architecture that is based on analog signal processing.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items. All documents cited herein are incorporated by reference herein in their entirety.

It is noted that although embodiments described herein are given in the context of NRZ and PAM4 implementations, one skilled in the art shall recognize that the teachings of the present disclosure are not so limited and may equally apply to M-ary PAM systems and methods, where M≥4, i.e., 6-PAM, 8-PAM, etc., and other contexts.

In this document, the term quantizer and soft quantizer may be used interchangeably. A soft quantizer refers to a non-linear transfer function that may be implanted in a circuit and that may map an analog input signal to a value closer to a nearest modulation symbol than the original input value. In this context, the use of the word "soft" is intended to indicate that the output signal is not hard limited to four discrete levels of the modulation, i.e., it is closer but need not be an exact match to an ideal, e.g., PAM4 value. Further, the term "error estimator" refers to a circuit that is configured to subtract a soft quantized value (e.g., PAM4) from the original input signal to generate an error estimate between ideal and actual received signal values.

FIG. 1 is a block diagram of a conventional DP-QAM receiver architecture that is based on analog signal processing. Receiver 100 is a homodyne receiver driven by an on-channel laser (not shown) that acts as the local oscillator. The arrangement of the polarization beam splitter and 90° hybrids 106 is designed to provide balanced quadrature light outputs for each of the two orthogonal polarizations, conventionally labeled X and Y, which are incident on eight photodiodes 108 that are arranged in balanced pairs. This arrangement results in four bipolar photocurrents 110 that are amplified by respective Trans Impedance Amplifiers (TIAs) 112, corresponding to in-phase (I) and quadrature (Q)-phases of the X- and Y-polarizations, respectively. Thus, four branches of receiver 100, i.e., XI, XQ, YI, YQ, are available for further signal processing in the analog domain.

Existing electronic polarization control loops are useful to separate and phase-align the dual polarization coherent signals. LMS adaption is used in the coherent optical signal processor to track random phase rotations and other impairments. Least mean square (LMS) adaption is performed using a continuous version of the classic RLMS update equation on eight coefficients held, for example, in analog integrators as charge on capacitors.

Eight coefficients represent a 2×2 complex matrix that is used to separate and phase correct the incoming analog signal:

$$\begin{bmatrix} E_{XO} \\ E_{YO} \end{bmatrix} = \begin{bmatrix} C_{1X} & C_{1Y} \\ C_{2X} & C_{2Y} \end{bmatrix} \cdot \begin{bmatrix} E_{XI} \\ E_{YI} \end{bmatrix}$$

Considering a dual-polarization coherent optical receiver having four independent branches, XI, XQ, YI, and YQ, that represent the I and Q components of two arbitrary orthogonal polarizations X and Y, and neglecting losses and dispersion in the optical channel, the observed X and Y signals in the receiver branches may be represented in complex notation as $$\begin{bmatrix} X_{in} \\ Y_{in} \end{bmatrix} = e^{i\psi/2} \begin{bmatrix} e^{i\phi_1/2} & 0 \\ 0 & e^{-i\phi_1/2} \end{bmatrix} \begin{bmatrix} \cos\theta & \sin\theta \\ -\sin\theta & \cos\theta \end{bmatrix} \begin{bmatrix} e^{i\phi_0/2} & 0 \\ 0 & e^{-i\phi_0/2} \end{bmatrix} \begin{bmatrix} E_{xi} \\ E_{yi} \end{bmatrix},$$

where $\psi$, $\phi_1$, $\theta$ and $\phi_0$ are four real parameters, $\psi$ represents the absolute phase, $\phi_0$ represents relative phase shift between X- and Y-polarization signals before a plane polarization rotation by $\theta$, and $\theta_1$ represents the relative phase shift afterwards. By multiplying all of these sub-components, a single 2×2 complex matrix is obtained that relates the received signal to the transmitted signal as follows:

$$\begin{bmatrix} X_{in} \\ Y_{in} \end{bmatrix} = \begin{bmatrix} \Gamma_{1X} & \Gamma_{1Y} \\ \Gamma_{2X} & \Gamma_{2Y} \end{bmatrix} \begin{bmatrix} E_{xi} \\ E_{yi} \end{bmatrix},$$

The matrix $\Gamma$ is unitary due to the factors that used to create it. Matrix $\Gamma$ is therefore invertible, and an estimate of the original transmitted waveforms may be obtained as:

$$\begin{bmatrix} \hat{E}_{xi} \\ \hat{E}_{yi} \end{bmatrix} = \begin{bmatrix} \Gamma_{1X} & \Gamma_{1Y} \\ \Gamma_{2X} & \Gamma_{2Y} \end{bmatrix}^{-1} \begin{bmatrix} X_{in} \\ Y_{in} \end{bmatrix}.$$

Thus, there exists a new demixing matrix, $C \stackrel{\text{def}}{=} \Gamma^{-1}$, which may be substituted into the above matrix equation to yield:

$$\begin{bmatrix} X_{out} \\ Y_{out} \end{bmatrix} \stackrel{\text{def}}{=} \begin{bmatrix} \hat{E}_{xi} \\ \hat{E}_{yi} \end{bmatrix} = \begin{bmatrix} C_{1X} & C_{1Y} \\ C_{2X} & C_{2Y} \end{bmatrix} \begin{bmatrix} X_{in} \\ Y_{in} \end{bmatrix}.$$

This represents two linear equations, each having two complex coefficients, i.e., $$X_{out} = C_{1X} X_{in} + C_{1Y} Y_{in}$$

and $$Y_{out} = C_{2X} X_{in} + C_{2Y} Y_{in}.$$

Although these two equations look independent, they derive from only four independent real parameters and, hence, the coefficients on the top and bottom rows of the matrix are not independent from each other. Nevertheless, they may be treated as independent for the purposes of iterating towards a solution as long as they do not converge in a manner such that the top and bottom rows are related to each other by a proportionality constant, i.e., $X_{out} = \alpha Y_{out}$, where $\alpha$ is the proportionality constant.

Solving one of these equations (and assuming that a similar technique may be applied to the other similar equation) provides $X_{out} = C_{1X} X_{in} + C_{1Y} Y_{in}$, in which only the observed signals $X_{in}$ and $Y_{in}$ are known. Although the estimated symbol $\hat{E}_{xi} = X_{out}$ is unknown, it is known that ideal samples of $X_{out}$ should be drawn from the finite alphabet of the modulation constellation in use, e.g., in 16-QAM modulation, which can be considered as 4-PAM signaling in each of the quadrature channels. Hence, for any candidate trial values of $C_{1X}$ and $C_{1Y}$, the error may be estimated as the difference between the nearest valid constellation point and the output signal $X_{out}$, denoted by $Q(X_{out})$ and $X_{out}$. Let $e(X_{out}) \overset{def}{=} Q(X_{out})-X_{out}$. The quantizer, Q, may be defined as two PAM4 modulation quantizers that operate, at least approximately, independently in the I- and Q-dimensions.

Based on the known complex LMS update equation, one may iterate towards a minimum error condition by accumulating into coefficients $C_{1X}$ and $C_{1Y}$ using the following update equations:

$$C_{1X} \Leftarrow C_{1X} + \mu(Q(X_{out}) - X_{out}) \times X_{in}^*$$
$$C_{1Y} \Leftarrow C_{1Y} + \mu(Q(X_{out}) - X_{out}) \times Y_{in}^*$$
$$X_{out} = X_{in} \times C_{1X} + Y_{in} C_{1Y}$$

Expanding the above complex expressions using:

$$X_{out} \overset{def}{=} X_{Iout} + iX_{Qout}; C_{1X} \overset{def}{=} C_{1XI} + iC_{1XQ}; C_{1Y} \overset{def}{=} C_{1YI} + iC_{1YQ};$$
$$C_{2X} \overset{def}{=} C_{2XI} + iC_{2XQ}; C_{2Y} \overset{def}{=} C_{2YI} + C_{2YQ}$$

yields for computation of the output for real and imaginary parts of the X-polarization output:

$$X_{Iout} = X_{I_{in}} \times C_{1XI} - X_{Qin} \times C_{1XQ} + Y_{I_{in}} \times C_{1YI} - Y_{Qin} \times C_{1YQ}$$
$$X_{Qout} = X_{Qin} \times C_{1XI} + X_{I_{in}} \times C_{1XQ} + Y_{Qin} \times C_{1YI} + Y_{I_{in}} \times C_{1YQ}.$$

The coefficient update equations for the real and imaginary parts of upper row of the coefficient matrix are then:

$$C_{1XI} \Leftarrow C_{1XI} + \mu(Q(X_{Iout}) - X_{Iout}) \times X_{I_{in}} + \mu(Q(X_{Qout}) - X_{Qout}) \times X_{Q_{in}}$$
$$C_{1XQ} \Leftarrow C_{1XQ} + \mu(Q(X_{Qout}) - X_{Qout}) \times X_{I_{in}} + \mu(Q(X_{Iout}) - X_{Iout}) \times X_{Q_{in}}$$
$$C_{1YI} \Leftarrow C_{1YI} + \mu(Q(X_{Iout}) - X_{Iout}) \times Y_{I_{in}} + \mu(Q(X_{Qout}) - X_{Qout}) \times Y_{Q_{in}}$$
$$C_{1YQ} \Leftarrow C_{1YQ} + \mu(Q(X_{Qout}) - X_{Qout}) . \times Y_{I_{in}} + \mu(Q(X_{Iout}) - X_{Iout}) \times Y_{Q_{in}}$$

Similarly, one may write for the Y-polarization output:

$$Y_{out} = X_{in} \times C_{2X} + Y_{in} C_{2Y},$$

which expands to:

$$Y_{Iout} = X_{I_{in}} \times C_{2XI} - X_{Qin} \times C_{2XQ} + Y_{I_{in}} \times C_{2YI} - Y_{Qin} \times C_{2YQ}$$
$$Y_{Qout} = X_{Qin} \cdot C_{2XI} + X_{I_{in}} \cdot C_{2XQ} + Y_{Qin} \cdot C_{2YI} + Y_{I_{in}} \cdot C_{2YQ}.$$

And the corresponding update equations are:

$$C_{2X} \Leftarrow C_{2X} + \mu(Q(Y_{out}) - Y_{out}) \times X_{in}^*$$
$$C_{2Y} \Leftarrow C_{2Y} + \mu(Q(Y_{out}) - Y_{out}) \times Y_{in}^*$$

which expand to:

$$C_{2XI} \Leftarrow C_{2XI} + \mu(Q(Y_{Iout}) - Y_{Iout}) \times X_{I_{in}} + \mu(Q(Y_{Qout}) - Y_{Qout}) \times X_{Q_{in}}$$
$$C_{2XQ} \Leftarrow C_{2XQ} + \mu(Q(Y_{Qout}) - Y_{Qout}) \times X_{I_{in}} + \mu(Q(Y_{Iout}) - Y_{Iout}) \times X_{Q_{in}}$$
$$C_{2YI} \Leftarrow C_{2YI} + \mu(Q(Y_{Iout}) - Y_{Iout}) \times Y_{I_{in}} + \mu(Q(Y_{Qout}) - Y_{Qout}) \times Y_{Q_{in}}$$
$$C_{2YQ} \Leftarrow C_{2YQ} + \mu(Q(Y_{Qout}) - Y_{Qout}) \times Y_{I_{in}} + \mu(Q(Y_{Iout}) - Y_{Iout}) \times Y_{Q_{in}}$$

The result is eight real-valued update equations that may be used to find the four complex coefficients of the demixing matrix. In embodiments of the present disclosure, these update equations may be implemented in the analog domain as continuous-time integrators.

Figure 2:
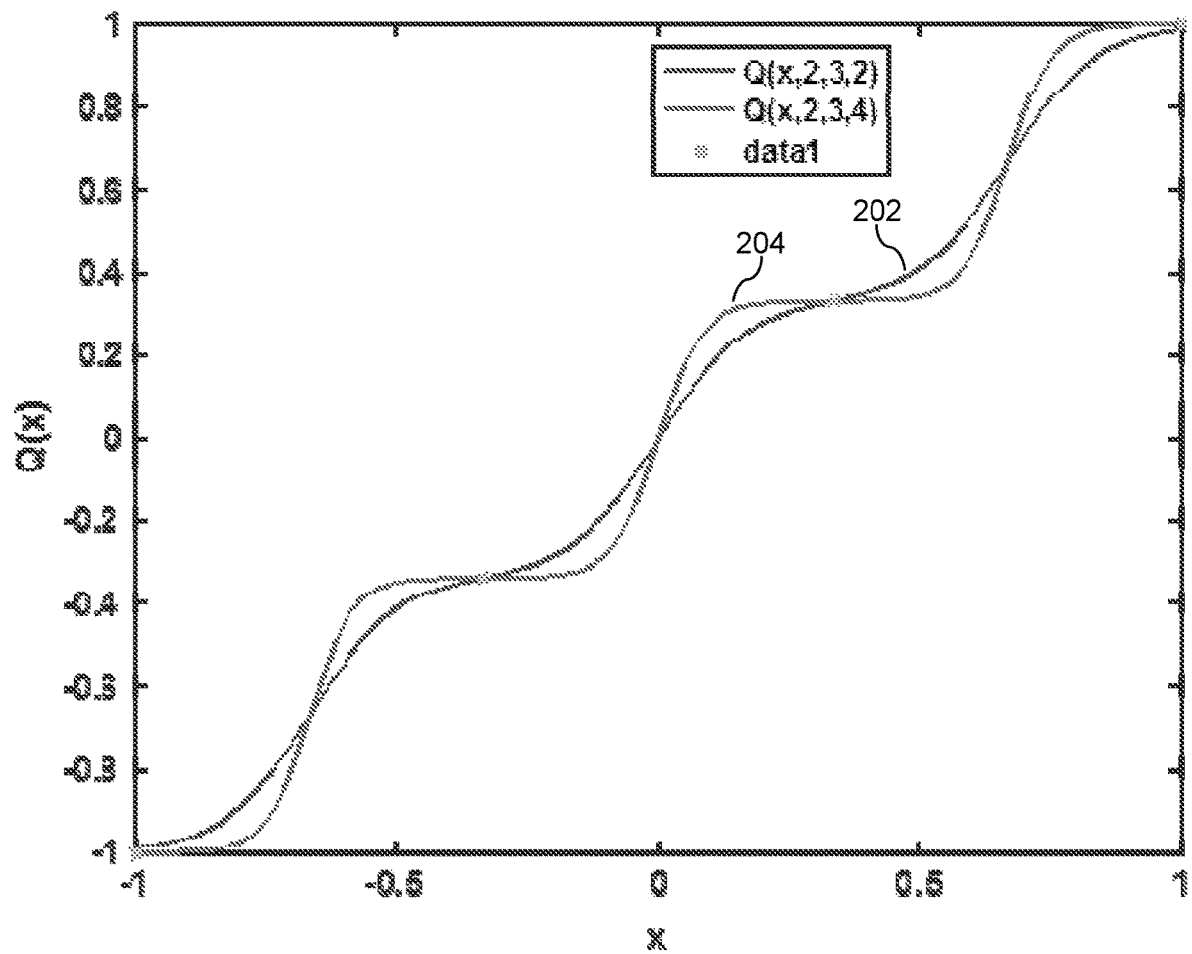
FIG. 2 shows common PAM4 quantizer transfer functions.

The above analysis treats the error signal as the difference between a (PAM4) quantized version of the signal and the signal itself, i.e., $e(X_{out}) \overset{def}{=} (X_{out})-X_{out}$. FIG. 2 shows common PAM4 quantizer transfer functions. The choice of the quantization function can have a significant impact on performance, particularly in the converged state where, ideally, $Q(X_{out})-X_{out}=0$. This outcome is less probable if the choice of $Q(\cdot)$ is not a faithful representation of the ideal PAM4 quantizer. As a result, spurious error estimates may cause spurious tap adjustments and hence create multiplicative noise in the output data streams. It is noted that the analog signal being analyzed is subject to bandwidth limitation and spends only a fraction of the unit interval (UI) at the desired PAM4 levels (i.e., at the region in the center of the eye). Hence, the error signal may have some unwanted fluctuations caused by signal transitions, even when the quantizer is mathematically perfect.

The parameterized slicing function may be simulated as:

$$Q(x, \Delta, s, \gamma) = \frac{\tanh(x.s.\gamma)}{s} + \frac{\tanh(x.s.\gamma - \Delta.\gamma)}{s} + \frac{\tanh(x.s.\gamma + \Delta.\gamma)}{s}$$

where x is the input voltage, $\Delta$ is the (unscaled) decision threshold for outer symbols of the PAM4 modulations, s is the scale factor such that the outer symbols take the values 3/s, and $\gamma$ is the gradient of the output vs. the input voltage.

The standard deviation of the error may be defined as $std(err(x))=std(Q(x)-x)$ when the input signal comprises random PAM4 symbols.

Figure 3:
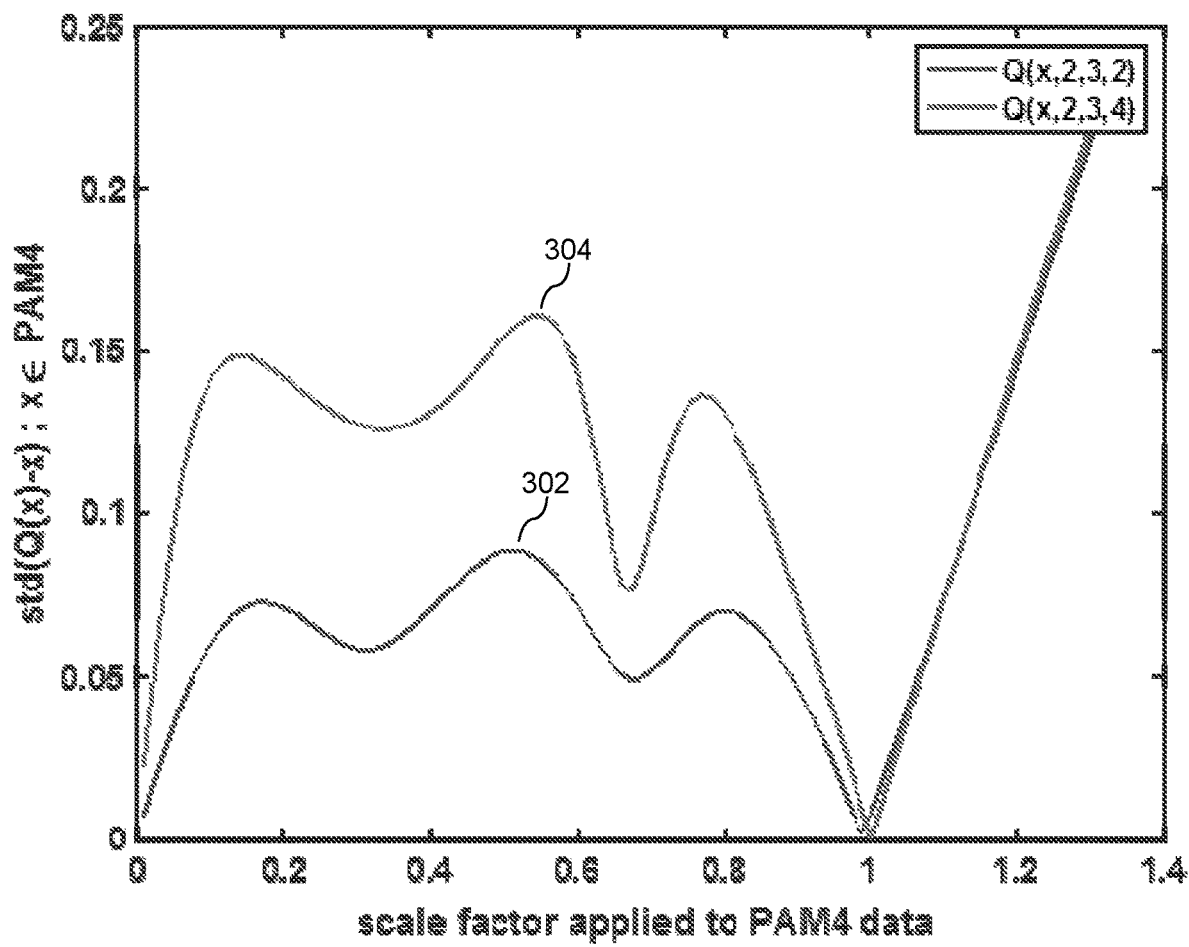
FIG. 3 illustrates standard deviation of errors for PAM4 data vs. an applied scale factor, according to embodiments of the present disclosure.

FIG. 3 illustrates standard deviation of errors for PAM4 data vs. an applied scale factor, using $\Delta=2$, according to embodiments of the present disclosure. As depicted, while the standard deviation of the error is nearly zero when the applied scale factor is unity, there exist two other local error minima 302, 304 at lower scale factors. This may cause the LMS loop to get locked in at one of local minima 302, 304 and similarly undesirable positions. Therefore, to address this problem, various embodiments consider the error profile of a modified quantizer, where, as shown in FIG. 4, the decision boundary $\Delta$ is moved closer to zero than the ideal match to the PAM4 constellation.

Figure 4:
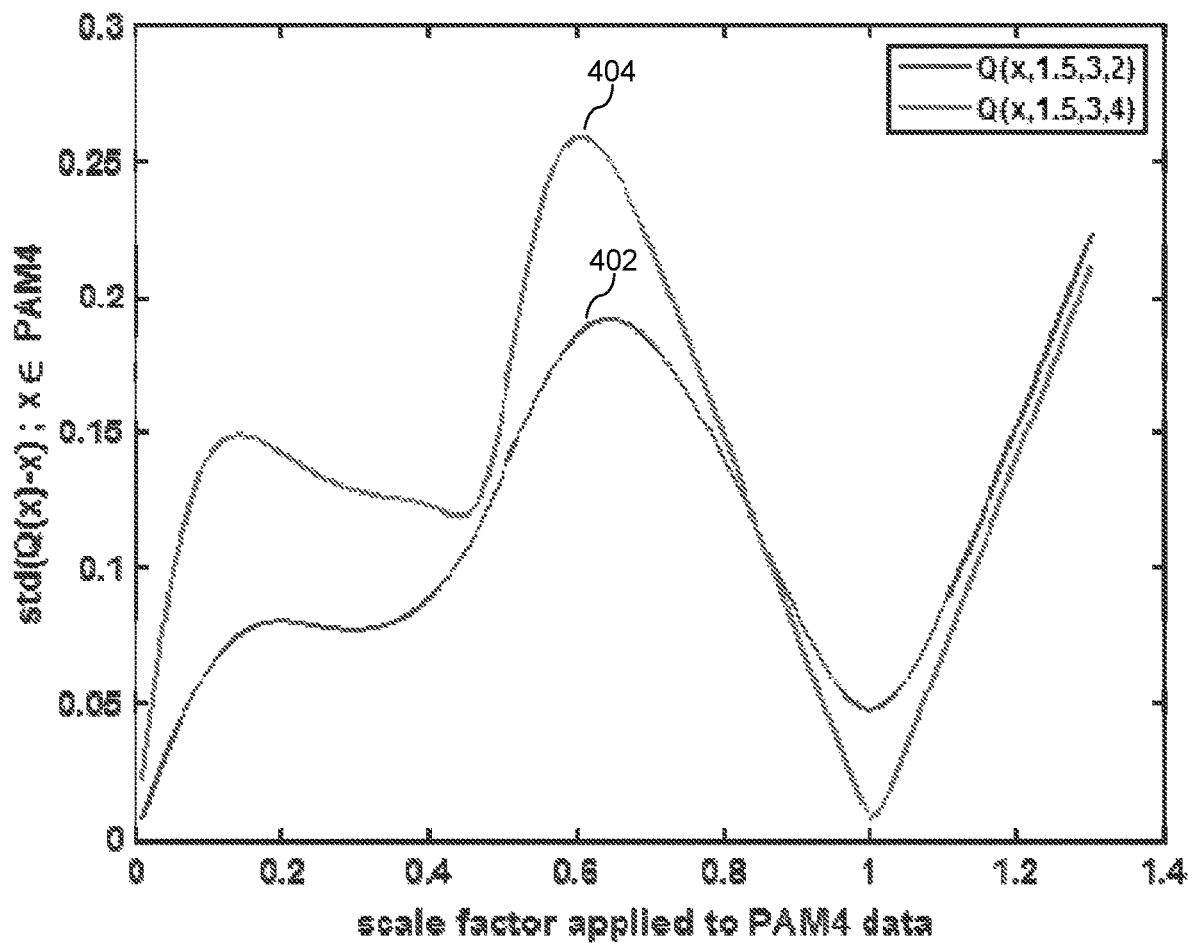
FIG. 4 illustrates a standard deviation of modified error quantization functions according to embodiments of the present disclosure, according to embodiments of the present disclosure.

FIG. 4 illustrates a standard deviation of modified error quantization functions according to embodiments of the present disclosure, using $\Delta=1.5$, according to embodiments of the present disclosure. Curve 402 shows that by changing just one parameter, the likelihood of a false convergence point may be reduced or removed. This may come at the cost of an increased steady-state error at the intended signal amplitude of unity. Curve 404 shows that increasing the slope reduces the steady-state error but at the expense of a more pronounced local minimum at around 0.45.

In embodiments, convergence commences with an error quantizer that may be defined by Q(x, 1.5, 3, 2) and, after convergence has been achieved, a switch to a tracking mode occurs with a quantizer defined by Q(x, 2, 3, 2). This may be achieved by using a DAC that controls a reference voltage that, in embodiments, defines the zero-crossing point of two differential amplifiers to effectively switch the transfer function from a convergence mode to a normal operating mode. The method to dynamically change the quantizer's behavior during initial convergence is herein referred as Dynamic Error Quantizer Tuning and may be performed by using a timer or, in embodiments, based on the value of a lock-bit that indicates that convergence has been achieved. As discussed in greater detail below with reference to FIG. 6 and FIG. 7, in embodiments, dynamic error quantizer tuning may be accomplished by adjusting threshold values that may be represented by DC bias values in comparator circuits. Adjusting DC bias values in this manner allows a smooth trade-off between low residual error at the desired operating point and the presence of unwanted local error minima.

Figure 5:
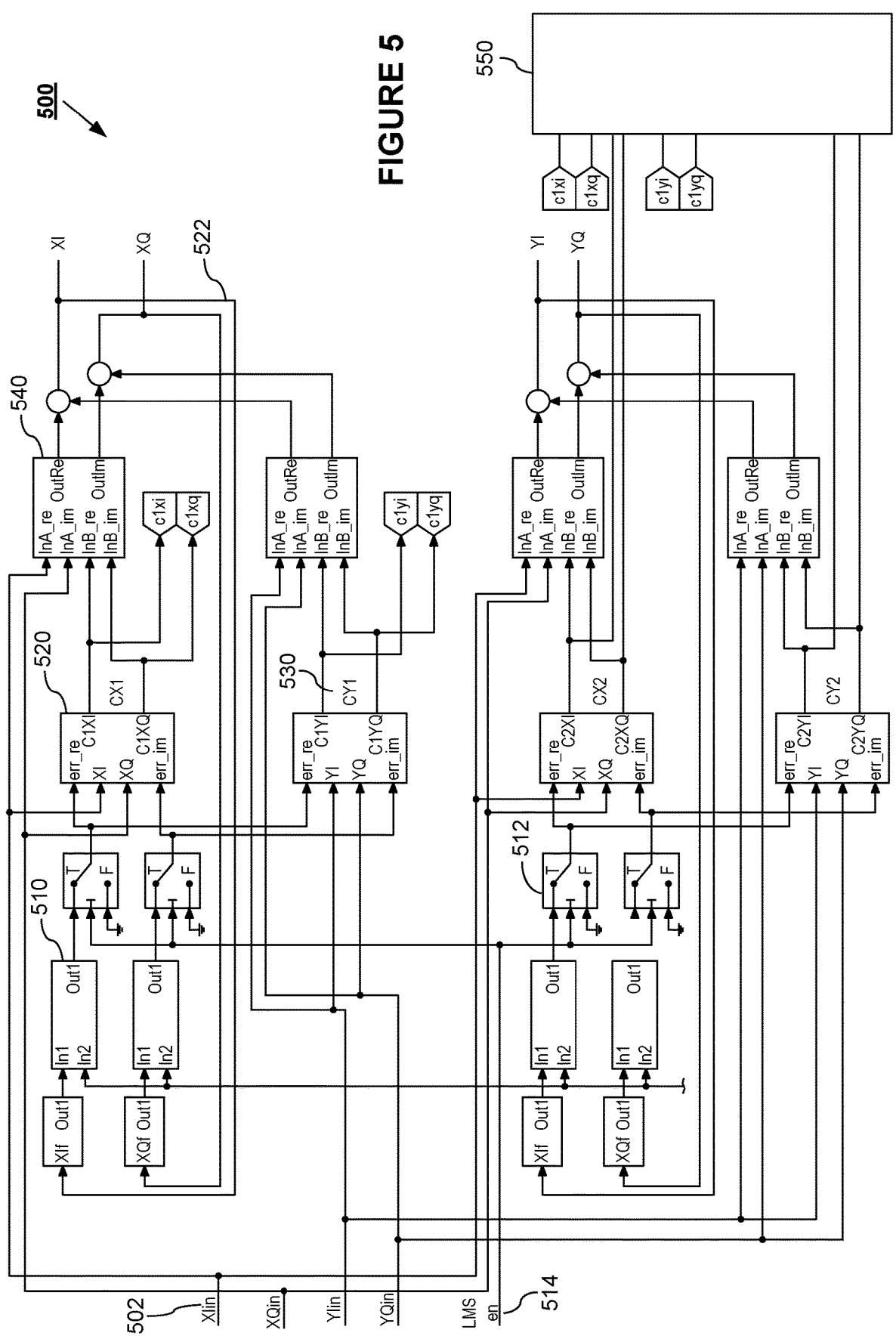
FIG. 5 illustrates an exemplary polarization and carrier phase correction circuit that comprises error quantizers according to embodiments of the present disclosure.

FIG. 5 illustrates an exemplary polarization and carrier phase correction circuit that comprises error quantizers according to embodiments of the present disclosure. Circuit 500 comprises error quantizers (e.g., 510) that may comprise a comparator circuit, switch (e.g., 512), adaption circuits (e.g., 520), complex multipliers (e.g., 540), and supervisory control circuit 550. At the top level, circuit 500 may be viewed as four complex multipliers (e.g., 540) that are representative of the Jones matrix. The multipliers multiply a time-varying 2×2 complex matrix by four input signals (e.g., 502) that each may be viewed as two complex signals, where the complex tap weights may be continuously adapted by using the LMS update equation to correct for the polarization and phase rotations in the optical channel.

In embodiments, adaption of the complex coefficients (e.g., 530) may be implemented by one analog LMS loop (e.g., 522) for each coefficient (e.g., 530). In embodiments, to correct for polarization and phase changes in the fiber, four real error quantizers 510 monitor the error, which may be a time-varying signal, and compare the error to an ideal constellation. Based on the comparison result, error quantizers 510 drive complex adaption circuits (e.g., 520) that determine four complex coefficients (e.g., 530) for the Jones matrix. Supervisory control circuit 550 may be implemented by unitary forcer circuit 550 that, in embodiments, switches the error quantizers (e.g., 510) to a non-return-to-zero (NRZ)-transmitted form of data modulation, such that data slicing generates binary symbol decisions, e.g., 1 and −1 (or 0 and 1 in unipolar notation) once the overall amplitude of the Jones matrix coefficients falls below a predetermined threshold.

In embodiments, one quantizer (e.g., 510) may operate with a zero DC bias as a conventional NRZ quantizer, and two other quantizers may be biased to equal and opposite thresholds, e.g., defined by one of two possible constants. In embodiments, switch 512 may use LMS enable signal 514 to select the mode of operation that is in effect at any given time. In embodiments, when the two variable slicing thresholds are set to zero, the overall transfer function may revert to a simple NRZ quantizer. NRZ mode is useful for ensuring convergence during startup while PAM4 mode provides more accurate error slicing for steady-state operation.

Polarization and carrier phase correction circuit 500 illustrated in FIG. 5 is not limited to the constructional detail shown there or described in the accompanying text. For example, as those skilled in the art will appreciate, switch 512 may be replaced by a suitable, ramp generator (not shown) that, in embodiments, may be used to apply a controlled DC voltage to cause error quantizer (e.g., 510) to smoothly transition between NRZ and PAM4 modes in a controlled fashion to avoid or reduce undesired transient effects caused by switching events. Such a ramp generator may generate a ramp from an initial voltage to a target voltage, e.g., a voltage that is asymmetric around a zero value.

Figure 6:
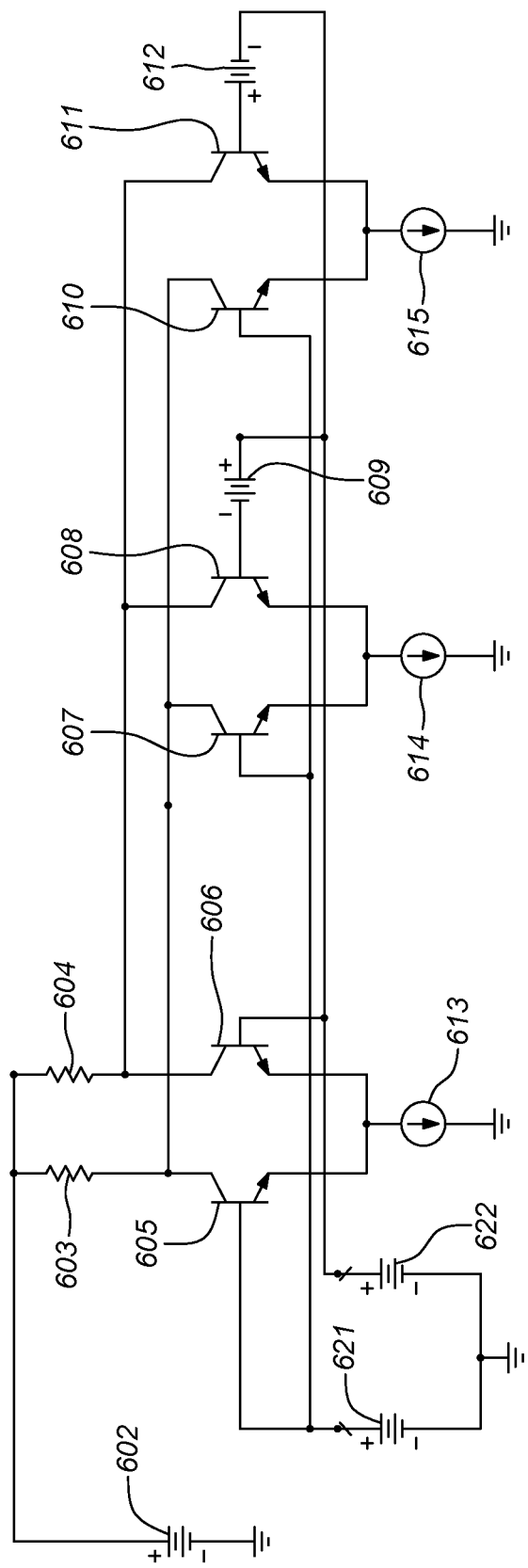
FIG. 6 is an exemplary circuit implementation of a soft quantizer according to various embodiments of the present disclosure.

FIG. 6 is an exemplary circuit implementation of a soft quantizer according to various embodiments of the present disclosure. In embodiments, quantizer 600 may implement a non-linear transfer function that maps an analog signal to a value that is closer to a nearest modulation symbol than the original input value. It is noted that the signal generated by quantizer 600 need not exactly match the discrete modulation levels of an ideal modulation value, e.g., a PAM4 value.

As shown in FIG. 6, quantizer 600 may be implemented as a PAM4 quantizer circuit that utilizes a current mode summation of three differential pair amplifiers. In embodiments, voltage bias (e.g., 609) may be applied to the differential base input terminals (e.g., 609) to offset the zero-crossing points of two of the amplifiers, e.g., relative to the nominally zero-crossing point of the remaining amplifier. As depicted in FIG. 6, two of the amplifiers may be DC biased to equal thresholds of opposite polarity. In embodiments, threshold values may be dynamically adjusted to tune quantizer 600 to transition between controllable states, e.g., from a NRZ mode to a PAM4 mode or vice versa.

Figure 7:
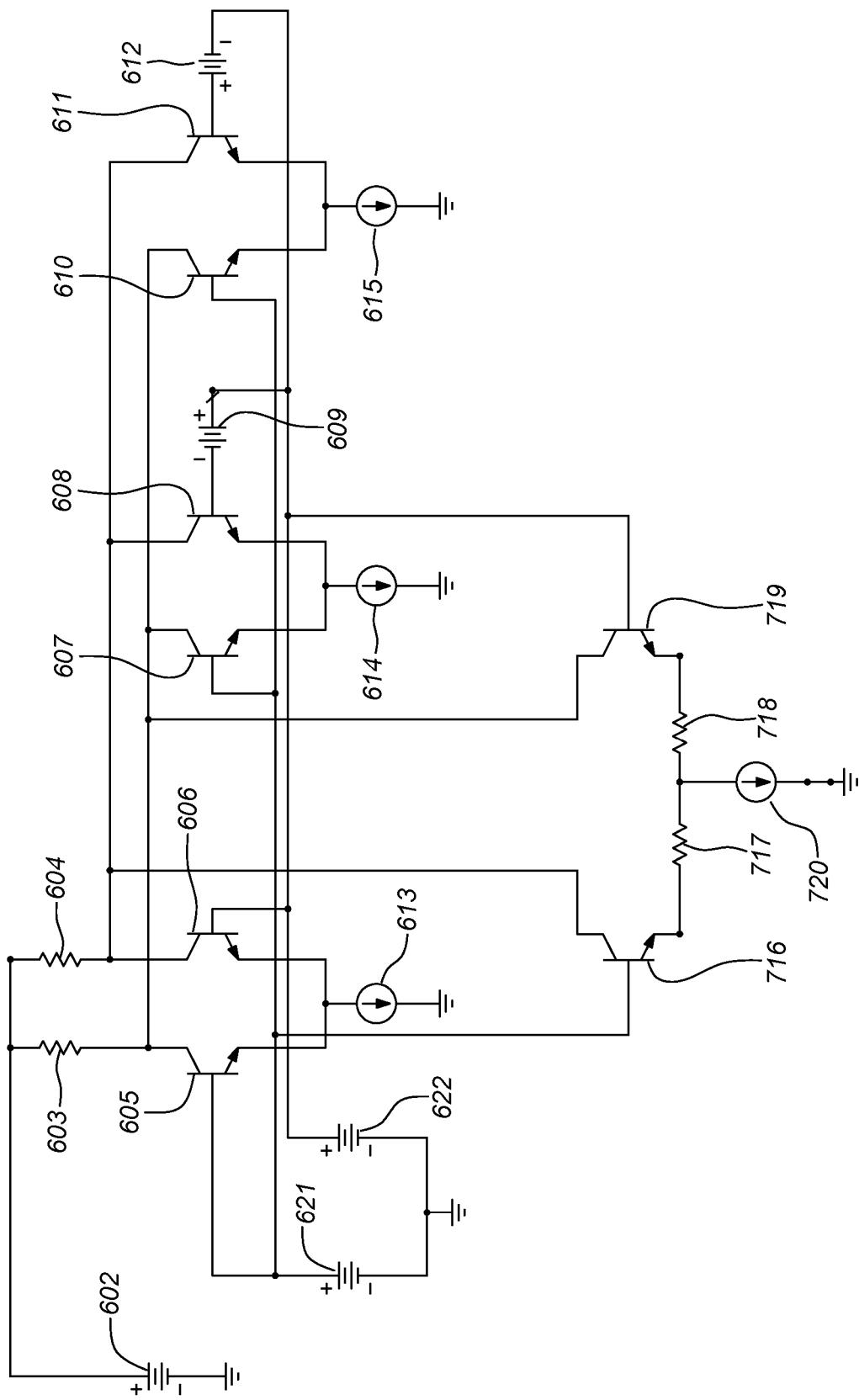
FIG. 7 is an exemplary circuit implementation of an error estimator according to various embodiments of the present disclosure.

FIG. 7 is an exemplary circuit implementation of an error estimator according to various embodiments of the present disclosure. In embodiments, error estimator 700 is an error detection circuit configured to generate a signal that is proportional to a difference between an output signal and a PAM4 quantized version of that output signal. The value of the obtained error estimate may be somewhere between ideal and actual received signal values. In embodiments, error estimator 700 may be implemented as a PAM4 error estimator that, in operation, subtracts a quantized value, e.g., a PAM4 soft quantized obtained according to FIG. 6, from the original input signal to generate the error estimate that may be used to drive, e.g., a complex LMS control loop shown in FIG. 5.

Figure 8:
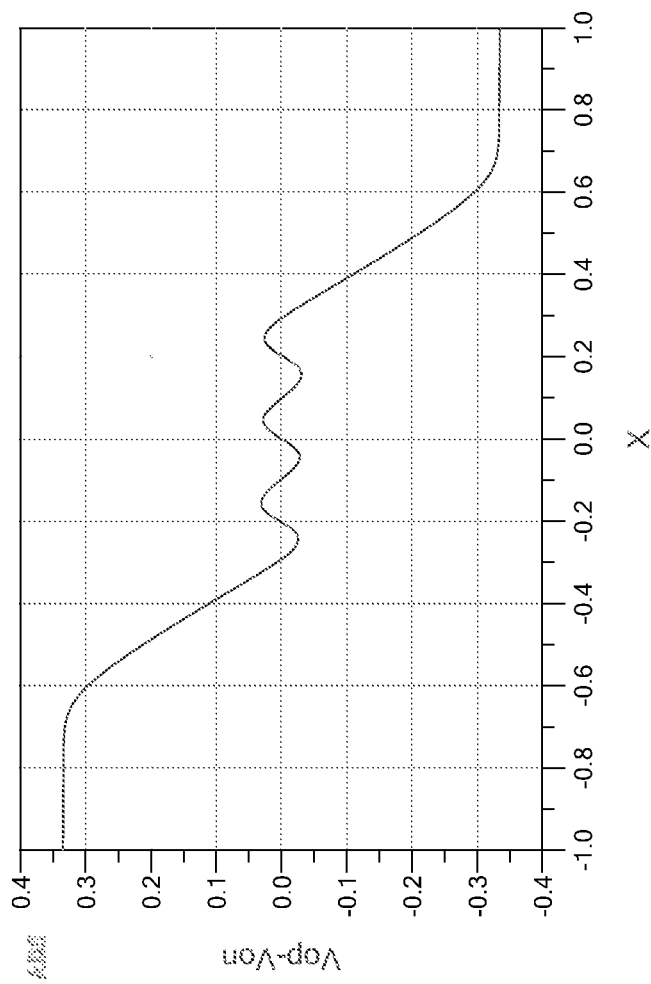
FIG. 8 is an exemplary error estimation transfer function that results from using a PAM4 error estimation circuit according to various embodiments of the present disclosure.

FIG. 8 is an exemplary error estimation transfer function that results from using a PAM4 error estimation circuit according to various embodiments of the present disclosure.

Figure 9:
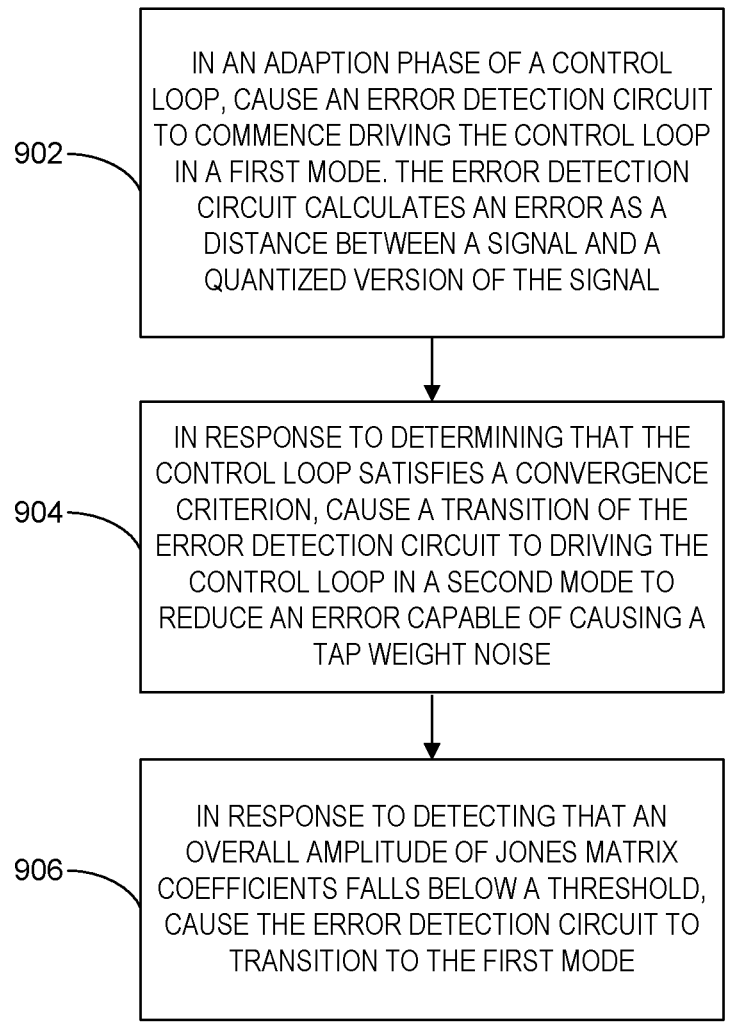
FIG. 9 is a flowchart of an illustrative process for dynamic error-quantizer tuning, according to embodiments of the present disclosure.

FIG. 9 is a flowchart of an illustrative process for dynamic error-quantizer tuning, according to embodiments of the present disclosure. In embodiments, process 900 begins at step 902 when, e.g., in an adaption phase of a control loop, an error detection circuit commences to drive the control loop in a first mode of operation, e.g., a convergence or NRZ mode. The error detection circuit may calculate an error as a distance between an output signal and quantized signal, e.g., a nearest predetermined symbol. In embodiments, the error detection circuit drives an adaptation circuit that controls a complex coefficient that represents a tap weight.

At step 904, in response to determining that the control loop satisfies a convergence criterion, the error detection circuit makes a transition to drive the control loop in a second mode of operation, e.g., a tracking or PAM4 mode, in order to reduce an error capable of causing a tap weight noise.

Finally, at step 906, in response to detecting that an overall amplitude of Jones matrix coefficients falls below a threshold, the error detection circuit may transition to the first mode of operation. It is noted that certain steps may optionally be performed; steps may not be limited to the specific order set forth herein; certain steps may be performed in different orders; and certain steps may be performed concurrently. It is further noted that embodiments disclosed herein apply to analog and/or digital implementations since digital tuning systems and methods may equally take advantage of the teachings of the present disclosure to control error quantization and estimation.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using Application Specific Integrated Circuits (ASICs), programmable arrays, digital signal processing circuitry, or the like. Accordingly, the terms in any claims are intended to cover both software and hardware implementations. The term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A polarization and carrier phase correction circuit comprising:
    error quantizers that use an error signal and an ideal modulation constellation to generate comparison results;
    complex adaption circuits that use the comparison results in a control loop to adjust a set of tap weights;
    analog complex multipliers that apply the tap weights to a set of input signals to correct for polarization and phase changes in at least one optical channel; and
    a control circuit that, in response to detecting that an amplitude on at least one signal in the set of input signals representing matrix coefficients is at or below a threshold, causes the error quantizers to operate in a first mode of operation and, in response to determining that the control loop satisfies a convergence criterion, causes the error quantizers to operate in a second mode of operation to reduce a time-varying signal error that causes a tap weight noise.

2. The circuit according to claim 1, wherein the tap weights represent coefficients of a complex 2×2 matrix.

3. The circuit according to claim 1, further comprising switches coupled to the error quantizers and the complex adaption circuits and, in response to a least-mean-square (LMS) enable signal, switching between the first and second modes of operation.

4. The circuit according to claim 1, wherein the first mode of operation is one of a convergence mode or a non-return-to-zero (NRZ) mode and wherein the second mode of operation comprises one of a tracking mode or a regular mode.

5. The circuit according to claim 4, wherein the first mode of operation causes data slicing to generate binary symbol decisions.

6. The circuit according to claim 1, wherein the control circuit is implemented by a unitary forcer circuit.

7. The circuit according to claim 1, wherein the error quantizers comprise comparator circuits that generates the comparison results.

8. The circuit according to claim 1, wherein the complex adaption circuits use an LMS update equation when adjusting the set of tap weights.

9. The circuit according to claim 1, further comprising, a ramp generator that generates a ramp from an initial voltage to a target voltage, the ramp being asymmetric around a zero value.

* * * * *